United States Patent

Konishi et al.

[11] Patent Number: 6,143,238
[45] Date of Patent: Nov. 7, 2000

[54] METHOD FOR MANUFACTURING A CERAMIC HEATER

[75] Inventors: Masahiro Konishi, Kariya; Shindo Watanabe, Nagoya, both of Japan

[73] Assignee: NGK Spark Plug Co., Ltd., Nagoya, Japan

[21] Appl. No.: 09/239,685

[22] Filed: Jan. 29, 1999

[30] Foreign Application Priority Data

Jan. 30, 1998 [JP] Japan .................................. 10-034284
Nov. 13, 1998 [JP] Japan .................................. 10-323324

[51] Int. Cl.[7] .................................................. C04B 33/32
[52] U.S. Cl. .......................................... 264/614; 264/618
[58] Field of Search ........................ 264/614, 618, 264/620

[56] References Cited

U.S. PATENT DOCUMENTS

| | | |
|---|---|---|
| 2,102,301 | 12/1937 | Arnold . |
| 2,131,887 | 10/1938 | Friederich et al. . |
| 2,498,442 | 2/1950 | Morey . |
| 2,735,162 | 2/1956 | Huck . |
| 4,613,455 | 9/1986 | Suzuki et al. ............................ 252/516 |
| 4,668,452 | 5/1987 | Watanabe et al. ........................ 501/90 |
| 4,855,575 | 8/1989 | Melanson ................................. 219/541 |
| 5,736,095 | 4/1998 | Shimada et al. ......................... 264/614 |

FOREIGN PATENT DOCUMENTS

| | | |
|---|---|---|
| 0 332 082 | 9/1989 | European Pat. Off. . |
| 44 40 005 | 5/1995 | Germany . |
| 60-28194 | 2/1985 | Japan . |
| 62-82685 | 4/1987 | Japan . |
| 4-4715 | 1/1992 | Japan . |

*Primary Examiner*—Christopher A. Fiorilla
*Attorney, Agent, or Firm*—Morgan, Lewis & Bockius LLP

[57] ABSTRACT

Ceramic raw powder containing conductive ceramic powder is mixed with a prescribed quantity of a molding assistant containing carbon component. This mixture is molded into a prescribed shape of a resistive heating element to thereby produce a heating element mold. A composite mold is prepared by embedding the heating element mold into molds of a ceramic substrate. The composite mold is sintered at a sintering temperature of 1700° C. or higher. During a process of rising temperature to the sintering temperature, the composite mold is kept in an oxygen containing atmosphere having an oxygen partial pressure of $2 \times 10^{-4}$ to 1.0 Torr for 7 minutes or longer at a temperature of 1200° C. or higher.

8 Claims, 9 Drawing Sheets

METHOD FOR MANUFACTURING A CERAMIC HEATER

BACKGROUND OF THE INVENTION

1. Field of the Invention

The present invention relates to a ceramic heater, and more particularly to a ceramic heater used, for example, for a ceramic glow plug and a method of manufacturing it.

2. Description of the Related Art

As a ceramic heater used, for example, for a ceramic glow plug, a structure has been known in which a resistive heating element made of a ceramic conductive material is embedded in an insulating ceramic substrate. As a conductive ceramic ingredient contained in the resistive heating element, silicide of a transient metallic element (e.g. molybdenum disilicide ($MoSi_2$)) has been widely used in recent years because it has a swift heating property reaching a saturated temperature in a short time and can improve the starting property of an engine.

The ceramic heater as described above is commonly manufactured by preparing a composite mold in which a heating element mold is embedded in a mold of raw material powder of a ceramic element, the heating element mold being prepared by molding ceramic raw material powder containing conductive ceramic powder mixed with a prescribed quantity of organic binder into a shape of a prescribed resistive heating element, and sintering the composite mold at a prescribed temperature. If the conductive ceramic ingredient in the ceramic resistive heating element is $MoSi_2$, it is important to adjust a sintering atmosphere as necessary so that the $MoSi_2$ raw material powder does not deteriorate during sintering. For example, Examined Japanese Patent Publication 4-4715 discloses a technique for sintering the ceramic resistive heating element, composed of a matrix of $Si_3N_4$ and a conductive ceramic component of $MoSi_2$, in a non-oxidizing atmosphere not containing nitrogen (inclusive of the vacuum atmosphere) or a nitrogen-containing non-oxidizing atmosphere at a nitrogen partial pressure of 0.3 atm or lower. The publication describes the reason why the above sintering atmosphere is used: if a compound of $Si_3N_4$ and $MoSi_2$ is sintered at the nitrogen partial pressure of 0.3 atm, most of $MoSi_2$ deteriorates and hence the temperature-rising characteristic of the ceramic resistive heating element is attenuated.

However, as a result of careful investigation by the inventors of the present invention, it has been found that as regards the ceramic resistive heating element containing transient metallic silicide, the deterioration of the metallic silicide cannot be restricted sufficiently by only adjusting the atmosphere during sintering so that the temperature-rising characteristic may be attenuated, or an electric resistance value may be altered, which makes it impossible to obtain an improved resistive heating element.

SUMMARY OF THE INVENTION

It is an object of the present invention to provide a method for manufacturing a ceramic heater with a conductive ceramic ingredient in a resistive heating element being mainly composed of transient metallic silicide, which can restrict the deterioration of contained metallic silicide and provide a ceramic heater manufactured by the method.

In a manufacturing method of a ceramic heater according to the present invention, ceramic raw powder containing conductive ceramic powder is mixed with a prescribed quantity of a molding assistant containing carbon component. This mixture is molded into a prescribed shape of a resistive heating element to thereby produce a heating element mold. A composite mold is prepared by embedding the heating element mold into molds of a ceramic substrate. The composite mold is sintered at a temperature of 1700° C. or higher. During a process of rising temperature to the sintering temperature, the atmosphere is changed to an oxygen containing one having an oxygen partial pressure of $2 \times 10^{-4}$ to 1.0 Torr for 7 minutes or longer at a temperature of 1200° C. or higher.

In a ceramic heater according to the present invention, a carbon content within said ceramic resistive heating element obtained by sintering is 3000 ppm or less.

DETAILED DESCRIPTION OF THE INVENTION

Figure 1:
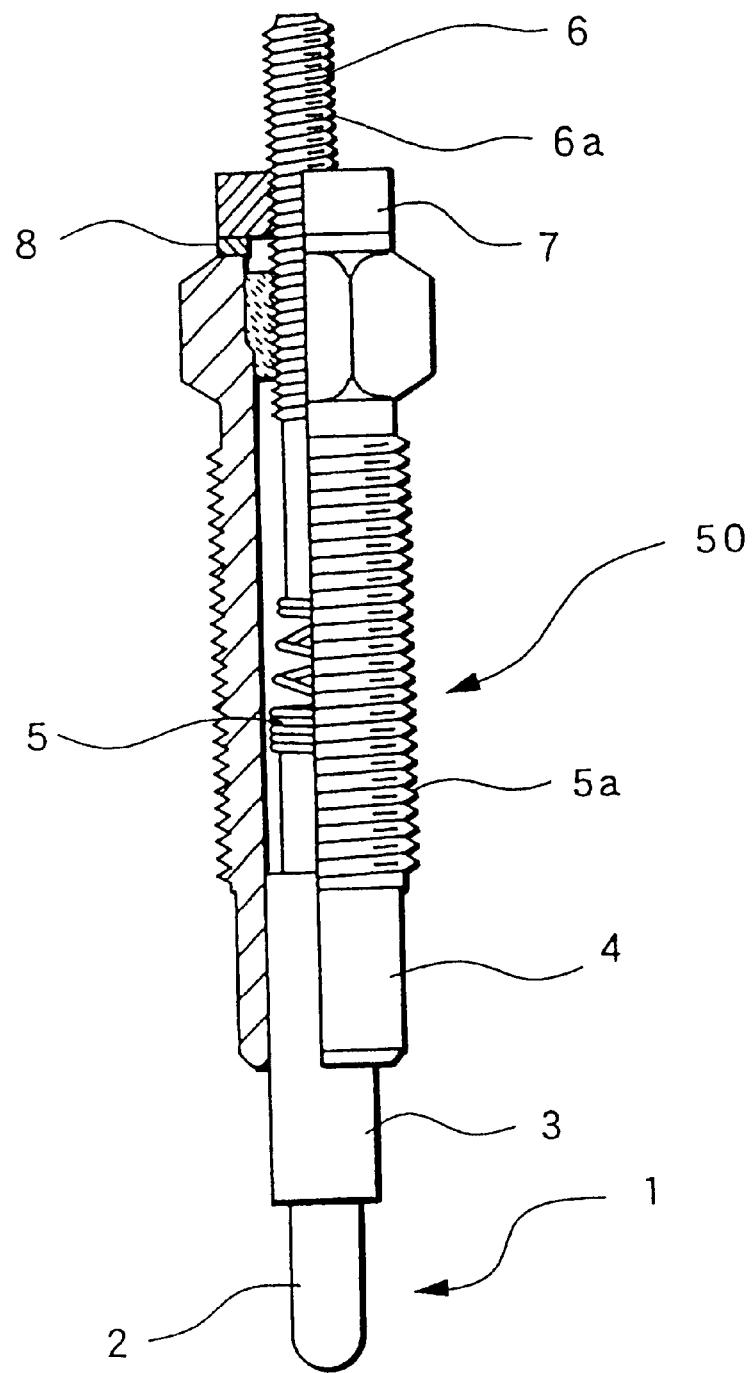
FIG. 1 is a sectional view of a front portion of one example of a glow plug provided with a ceramic heater according to the present invention.

Detailed description of the present invention will be described as follows.

The present invention relates to a method for manufacturing a ceramic heater having a structure in which a ceramic resistive heating element is embedded in a ceramic substrate, the ceramic heating element containing a conductive ceramic phase mainly composed of a metallic element component of metallic silicide having one or more elements selected from the group consisting of Ta, Nb, Ti, Mo, Zr, Hf, V and Cr. The present invention has the following features. A ceramic raw powder contains conductive ceramic powder to be a conductive ceramic phase. The ceramic raw powder is mixed with a prescribed quantity of molding assistant containing carbon component. This mixture is molded into a heating element mold having a prescribed shape of a resistive heating element. A composite mold is prepared by embedding the heating element mold in a substrate mold being a mold of raw powder of the ceramic substrate. The composite mold is sintered at a temperature of 1700° C. or higher. Through the sintering step, a heating element mold constitutes the ceramic resistive heating element and a substrate mold constitutes the ceramic substrate. In the first method of manufacturing a ceramic heater according to the present invention, during a process of rising temperature to the sintering temperature, the sintering atmosphere is changed to an oxygen containing one having an oxygen partial pressure of $2\times10^{-4}$ to 1.0 Torr for 7 minutes or longer at a temperature of 1200° C. or higher.

In the second method of manufacturing a ceramic heater according to the present invention, during a process of rising temperature to said sintering temperature, the atmosphere is changed to an oxygen containing one having an oxygen partial pressure of $2'10^{-4}$ to 1.0 Torr so that a carbon content within the ceramic resistive heating element obtained by sintering is reduced to 3000 ppm or less.

The molding assistant containing carbon may be an organic binder such as wax or polypropylene. Several kinds of organic additive agent can be mixed as necessary.

If the mold contains the molding assistant, in order to improve the characteristic of the resultant resistive heating element, it is important to dissolve or evaporate the molding assistant so as to reduce the remaining carbon component. Conventionally, it has been thought from the standpoint of view of restricting the oxidation/deterioration of a conductive ceramic that the atmosphere during temperature rising is desired to be a non-oxidizing atmosphere such as high vacuum atmosphere or inert gas atmosphere.

However, as a result of detailed investigation, it has been found that if the mold is heated in the non-oxidizing atmosphere, the carbon component due to the molding assistant cannot be sufficiently removed and a certain quantity of carbon necessarily remains in the sintered body. When the carbon component remains in this way, the metallic silicide in the ceramic resistive heating element is transformed into a metallic carbon silicide (e.g. non-stoichiometric silicide such as $Mo_{4.8}Si_3C_{0.6}$ if a raw conductive ceramic powder is $MoSi_2$). This gave rises to problems that the temperature-rising characteristic of the ceramic resistive heating element is deteriorated and the electric resistance thereof varies.

In the manufacturing method according to the present invention, the composite mold is heated in not a non-oxidizing atmosphere but a moderate oxidizing atmosphere in which extreme oxidation of metallic silicide does not occur and the carbon content originating from the molding assistant, specifically an oxygen containing atmosphere having an oxygen partial pressure of $2\times10^{-1}$ to 1.0 Torr. The heating of the composite mold is such an atmosphere promotes the oxidation/removal of the carbon content in the mold, and hence can very effectively suppress the deterioration of the metallic silicide in the ceramic resistive heating element which is attributable to its reaction with carbon. Thus, the ceramic heater can obtain a good temperature-rising characteristic and a less variation in the electric resistance.

The carbon component in the ceramic resistive heating element obtained by sintering can be reduced by the temperature rising in the above oxidizing atmosphere. However, the carbon content in the ceramic resistive heating element finally obtained is preferably 3000 ppm or less. This restricts the formation of the metallic carbide/silicide so that the temperature-rising characteristic of the ceramic resistive heating element is improved and the electric resistance value is difficult to vary. Incidentally, the carbon content is more preferably 2000 ppm or less.

When the oxygen partial pressure in the oxygen containing atmosphere during the temperature rising becomes not higher than $2\times10^{-4}$ Torr, the oxidation/removal of the carbon content is difficult to progress and a large quantity of carbon content in the ceramic resistive heating element remains, which results in the deterioration of the metallic silicide. On the other hand, when the oxygen partial pressure in the atmosphere exceeds 1.0 Torr, the oxidation of the metallic silicide is severe so that the temperature-rising characteristic of the ceramic resistive heating element is rather lowered. Therefore, the oxygen partial pressure is preferably $2\times10^{-4}$ to 1.0 Torr, more preferably $3\times10^{-3}$ to $5\times10^{-2}$ Torr.

While the composite mold is heated in the oxygen containing atmosphere, the sintering atmosphere may be changed to the oxygen containing atmosphere at a temperature of 1200° C. If the atmosphere is changed to the oxygen containing atmosphere at a temperature lower than 1200° C., the removal of the carbon component is insufficient, which leads to the deterioration of the metallic silicide. The time of 7 minutes or longer is preferred to assure that the composite mold has enough oxidation. A shorter time than 7 minutes cannot remove the carbon content sufficiently. The upper limit of the keeping time may be set suitably within a range where the efficiency of manufacturing is lowered. Under the premise that the atmosphere is kept as the oxygen containing one for over 7 minutes, the keeping time of 2 minutes or longer at 1350° C. or higher is preferred.

While changing the atmosphere to the oxygen containing atmosphere, the composite mold is heated at a predetermined rate, or at a held temperature. It maybe carried out with a mixed heating pattern of both manners. For example, the composite mold can be kept to the oxygen containing atmosphere while it is heated at a fixed temperature from a certain atmosphere starting temperature to an atmosphere ending temperature which is higher than it. In this case, the atmosphere starting and ending temperatures and the temperature-rising temperature are suitably set so that the keeping of the mold in the oxygen containing atmosphere at 1200° C. or higher is assured for 7 minutes or longer. On the other hand, the mold may be kept at a substantially prescribed temperature for a predetermined time while it is kept in the oxygen containing atmosphere at a temperature ranging from 1200° C. to a sintering temperature. This may promote the removal of the carbon component. The keeping temperature is preferably set within a range from 1200 to 1500° C. When the keeping temperature exceeds 1500° C., sintering of the mold proceeds to hinder the removal of the carbon component so that the effect due to the temperature keeping is not remarkable. The keeping temperature is more preferably set within a range of 1350 to 1500° C.

On the other hand, when the composite mold is heated from room temperature, for example, the atmosphere may be adjusted so that it provides the oxygen partial pressure from the time when the heating is started. Otherwise, the low temperature region (e.g. to 800° C. or so) where the reaction of the carbon component with the metallic silicide does not advance greatly, the temperature rising may be carried out in the atmosphere (with the oxygen atmosphere less than $2\times10^{-4}$ Torr) in which the oxygen partial pressure deviates from the above range.

The above effect of the present invention can be remarkably obtained where the ceramic raw powder used for the heating element mold contains the conductive ceramic powder and $Si_3N$ powder or AlN powder. In this case, the ceramic resistive heating element thus obtained has a structure in which a conductive ceramic phase is dispersed in a matrix ceramic phase having $Si_{N4}$ or AlN as a main element. The conductive ceramic phase having $MoSi_2$ as a main element constitutes a ceramic resistive heating element with excellent heat-resistant property. In this case, the conductive ceramic powder may be powder having $MoSi_2$.

The atmosphere for sintering atmosphere may be that in which the oxidation of the metallic silicide contained does not advance so excessively. It may be the reduced-pressure atmosphere with the oxygen partial pressure of 1 Torr., inert gas atmosphere such as He or Ar, or nitrogen atmosphere.

For example, the mold can be sintered at the above sintering temperature in a nitrogen atmosphere with the nitrogen partial pressure of 0.5 atm or higher. Examined Japanese Patent Publication No. 4-4715 discloses that when a compound of $Si_3N_4$ and $MoSi_2$ is heated in the atmosphere with the nitrogen partial pressure of 0. 3 atm or higher, more of $MoSi_2$ is transformed into $Mo_5Si_3$. However, as a result of a further investigation by the inventors of the present invention, it has been found that if the carbon component in the mold can be sufficiently removed before the temperature reach the sintering temperature, with the nitrogen partial pressure in the sintering atmosphere being 0.3 atm or higher, $MoSi_2$ is not almost transformed into $Mo_5Si_3$. Further, it has been found that where the ceramic resistive heating element is formed in which the conductive ceramic phase is dispersed in the matrix ceramic phase, the nitrogen partial pressure in the sintering atmosphere is set at 0.5 atm or higher so that decomposition of $Si_3N_4$ or AlN in the conductive ceramic phase is restricted, thus providing a ceramic heater with high strength and less variation of the electric resistance.

The content of the conductive ceramic in the ceramic raw powder used for the heating element mold is preferably 25 to 70% by weight. In this case, the content of the conductive ceramic phase in the ceramic resistive heating element is about 25 to 70% by weight. If the content of the conductive ceramic phase in the ceramic resistive heating element is less than 25% by weight, the electric resistivity of the heating element is so large that sufficient heat generation cannot be obtained. On the otherhand, if it exceeds 70% by weight, the sintering cannot be carried out sufficiently so that a good heating element cannot be obtained.

The present invention which can reduce the carbon content in the ceramic resistive heating element can provide the following ceramic heater. In the first construction of the ceramic heater according to the present invention, a ceramic resistive heating element is embedded in a ceramic substrate, the ceramic resistive heating element containing a conductive ceramic phase mainly constructed of a metallic element component of metallic silicide having one or more elements selected from the group consisting of Ta, Nb, Ti, Mo, Zr, Hf, V and Cr, and the ceramic resistive heating element contains a carbon content of 3000 ppm or less. The critical meaning of setting the carbon content within the ceramic resistive heating element at 3000 ppm or less has been described above. The carbon content is desirably 2000 ppm or less.

The conductive ceramic phase can be mainly constructed of e.g. $MoSi_2$ phase. In this case, if the carbon content in the ceramic resistive heating element is excessive, this $MoSi_2$ phase is transformed into a carbon silicide molybdenum phase, e.g. $Mo_{4.8}Si_3C_{0.6}$ phase. This leads to the problem that the temperature-rising characteristic of the ceramic resistive heating element may be deteriorated and the electric resistance may vary.

In the second construction of the ceramic heater according to the present invention, a ceramic resistive heating element is embedded in a ceramic substrate, the ceramic resistive heating element containing a conductive ceramic phase mainly constructed of a $MoSi_2$ phase. Further, when the ceramic heating element is subjected to the X-ray diffraction measurement at room temperature by a diffractive metering technique using a monochromatic X-ray having a wavelength of 1.54 Å (e.g. Kα1 ray of Cu), assuming that $I_1$ denotes an intensity of the diffraction wave peak satisfying $44.5°<2θ<44.9°$ (θ: diffraction angle at a peak position), and I2 is an intensity of the diffraction wave peak satisfying $43.40°<2θ<43.8°$, $I_1/(I_1+I_2)$ is not smaller than 0.98.

When the ceramic resistive heating element is subjected to the X-ray diffraction measurement, if the $MoSi_2$ phase exists in the resistive heating element, a comparatively strong diffraction wave peak based on the $MoSi_2$ (e.g. diffraction wave peak based on the (103) plane in the $MoSi_2$ phase) at an angular position of $44.6°<2θ<45.8°$ (e.g. $2θ=44.68°$, diffraction angle: θ). Likewise, if the $Mo_{4.8}Si_3C_{0.6}$ phase exists in the resistive heating element, a comparatively strong diffraction wave peak based on the $Mo_{4.8}Si_3C_{0.6}$ phase (e.g. diffraction wave peak based on the (112) plane in the $Mo_{4.8}Si_3C_{0.6}$ phase) at an angular position of $43.4°<2θ<43.8°$ (e.g. $2θ=43.580$). In this case, the value of $I_1/(I_1+I_2)$ reflects the existing rate of the $MoSi_2$ phase to the sum of the $MoSi_2$ phase and $Mo_{4.8}Si_3C_{0.6}$ phase in the ceramic resistive heating element. By restricting the $Mo_{4.8}Si_3C_{0.6}$ phase to be created in the ceramic resistive heating element to a little amount so that $I_1/(I_1+I_2)$ is 0.98 or larger, the temperature rising-characteristic of the heating element is improved and a variation in the electric resistance is difficult to occur. Incidentally, the value of $I_1/(I_1+I_2)$ is desired to be substantially 1, namely desired that the $Mo_{4.8}Si_3C_{0.6}$ phase has not been created to the utmost.

In the third construction of the ceramic heater according to the present invention, when the ceramic heating element is subjected to the X-ray diffraction measurement at room temperature by a diffractive metering technique using a monochromatic X-ray having a wavelength of 1.54 Å, assuming that Ii denotes an intensity of the diffraction wave peak based on the (103) plane in a $MoSi_2$, and $I_2$ is an intensity of the diffraction wave peak based on the (112) plane in a $Mo_{4.8}Si_3C_{0.6}$ phase, $I_1/(I_1+I_2)$ is not smaller than 0.98. By restricting the $Mo_{4.8}Si_3C_{0.6}$ phase to be created in the ceramic resistive heating element to a little amount so that $I_1/(I_1+I_2)$ is 0.98 or larger, the temperature-rising characteristic of the heating element is improved and a variation in the electric resistance is difficult to occur. Incidentally, the value of $I_1/(I_1+I_2)$ is desired to be substantially 1, namely desired that the $Mo_{4.8}Si_3C_{0.6}$ phase has not been created to the utmost.

Referring to the accompanying drawings, an explanation will be given of embodiments of the present invention.

FIG. 1 shows a glow plug using a ceramic heater manufactured by a manufacturing method according to the present invention and also its internal structure. The glow plug 50 includes a ceramic heater 1 provided on the one side thereof, an outer shell 3 overlaying the outer periphery of the ceramic heater 1 so that the tip 2 of the ceramic heater 1 protrudes and a cylindrical metallic housing 4 overlaying the outer periphery of the outer shell 3. The ceramic heat 1 and the outer shell 3 are soldered with each other, and the outer shell 3 and metallic housing 4 are soldered with each other.

The one end of a coupling member 5, both ends of which are formed in a helical spring shape of a metallic wire, is externally coupled with a rear end of the ceramic heater 1. The other end thereof is coupled with a corresponding one end of a metallic shaft 6 which is inserted into the metallic housing 4. The other end of the metallic shaft 6 extends to the exterior of the metallic housing 4. A nut 7 is screwed with a screw 6a formed on the outer periphery of the metallic shaft 6. The nut 7 is tightened toward the metallic housing 4 so that the metallic shaft 6 is secured to the metallic housing 4. An insulating bushing 8 is fit between the nut 7 and the metallic housing 4. On the outer periphery of the metallic housing 4, a screw portion 5a is formed for securing the glow plug 50 to an engine block (not shown).

Figure 2:
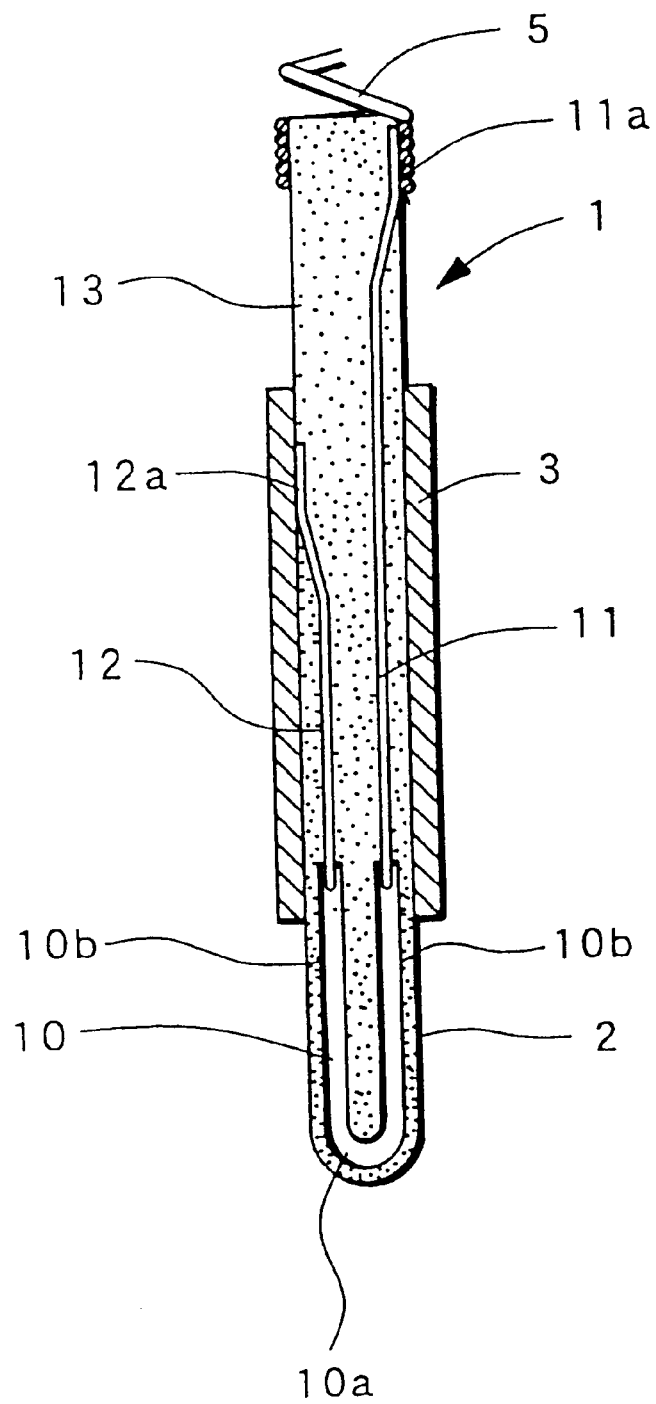
FIG. 2 is a front sectional view of the ceramic heater.

As shown in FIG. 2, the ceramic heater 1 is provided with a U-shaped ceramic resistive heating element (hereinafter referred to as simply "heating element") consisting of a direction conversion section 10a extending from the one stem to the other stem via a tip of the ceramic heater 1 and two linear sections 10b extending in the same direction form both stems. The tips of linear or rod-shaped electrodes 11 and 12 are embedded in both ends of the heating element 10. The heating element 10 and electrodes 11, 12 are wholly embedded in a rod-like ceramic substrate 13 having a circular cross section. The heating element 10 is arranged so that the direction converting section 10a is located on the terminal side of the ceramic substrate 13.

The ceramic substrate 13 is prepared by sintering powder of $Si_3N_4$ doped/mixed with a sintering assisting powder of rare earth oxide or alkaline-earth metallic oxide in a range of 3–15% by weight.

The heating element 10 is prepared by sintering mixed powder of $MoSi_2$ and $Si_3N_4$ serving as conductive ceramic powder, doped/mixed with the same sintering aiding component as used for the ceramic substrate 13 in a range of 0.8 to 10.5% by weight. The sintered body thereof is organized so that the $MoSi_2$ particles (conductive ceramic particles: $Mo_5Si_3$ may be partially contained) are dispersed within a $Si_3N_4$ matrix (matrix ceramic phase). Further, the heating element 10 contains a carbon component of 3000 ppm or less, preferably 2000 ppm or less within the ceramic portion. On the other hand, the electrodes 11 and 12 are constructed of a metallic line of W, W—Re, Mo, Pt, Nb, Nichrome, Ta, etc.

As seen from FIG. 2, a metallic layer of e.g. Ni (not shown) is formed on the region inclusive of an exposed portion 12a of the electrode 12 by a prescribed technique (e.g. plating and vapor-phase deposition). Through the metallic layer, the ceramic substrate 13 and the outer shell 3 are joined with each other by brazing. The electrode 12 is electrically communicated with the outer shell 3 via the coupling area. Likewise, a metallic layer is also formed on the region inclusive of the exposed area 11a of the electrode 11. A coupling member 5 is brazed on the metallic layer. In such a configuration, the heating element 10 is supplied with a current from a power supply (not shown) through the metallic shaft 6 (FIG. 1), coupling member 5 and electrode 11. The heating element 10 is grounded through the electrode 12, outer shell 3, metallic housing 4 (FIG. 1) and an engine block (not shown).

An explanation will be given of a method for manufacturing the ceramic heater 1. First, as seen from FIG. 3A, two electrode materials 30 are arranged within a cavity mold 31 having a U-shaped cavity 32 so that their one ends are located in the cavity 32. In this state, a compound 33 containing the raw material ceramic powder, which consists of powder containing $MoSi_2$ powder, power containing $Si_3N_4$ as a main component and sintering assisting powder, and binder (organic binder) is injected. Thus, as seen from FIG. 3B, a integral mold 35 composed of the electrode materials 30 and the U-shaped heating element mold 34 which are integrated with each other. The heating element mold 34 is formed to have a substantially circular axial section.

Figure 4A:
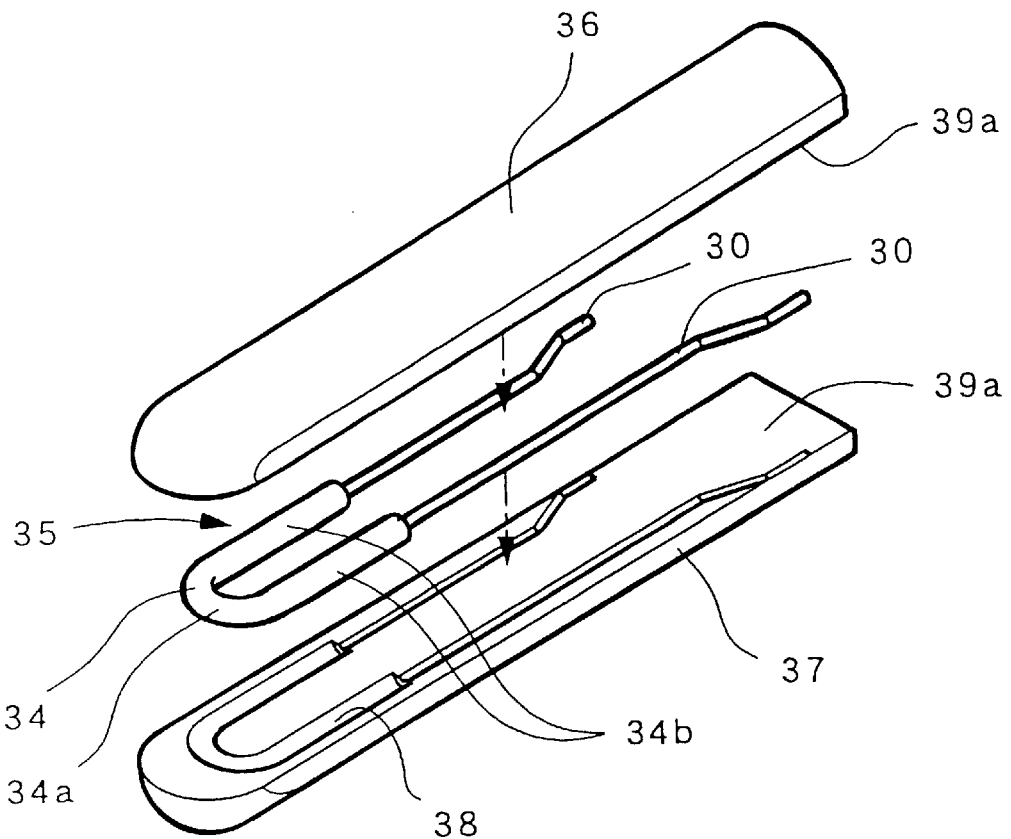
FIGS. 4A and 4B are views for explaining the steps succeeding to FIGS. 3A and 3B.
Figure 4B:
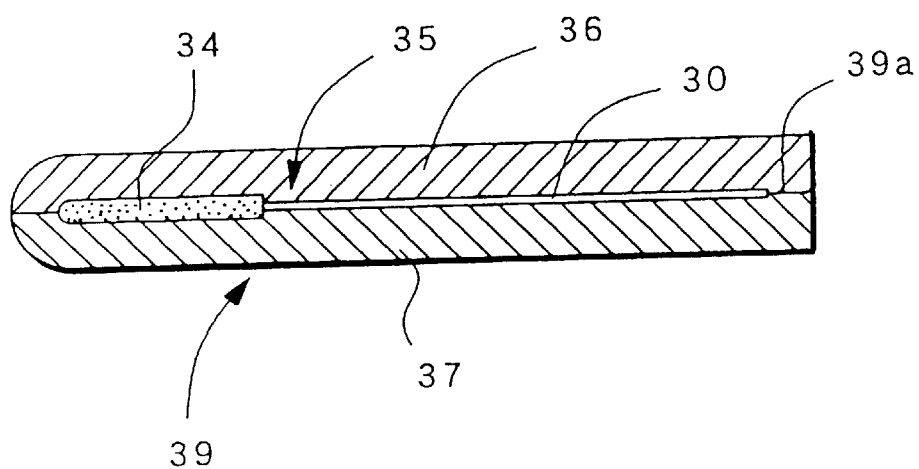

On the other hand, as seen from FIG. 4A, two separated preliminary molds 36 and 37 formed as upper and lower individual elements are prepared by mold-stamping the ceramic powder constituting the ceramic substrate 13. The ceramic powder may be powder of $Si_3N_4$, which is a main component and doped/mixed with a sintering assisting powder of 3 to 15% by weight and slight amount of binder for stamping.

These separated preliminary molds 36 and 37 have concave regions formed so as to correspond to the shape of the above integral mold 35 on their mating faces 39a. The integral mold 35 is received by the concave portions, and the separated preliminary molds 36 and 37 are mated with each other on the mating faces 39. As seen from FIG. 5A, in the above state, the separated preliminary molds 36, 37 and the integral mold 35 are housed in a cavity 61a of a cavity mold 61 and stamped and contracted using punches 62 and 63 to form a composite mold 39 of these elements. The stamping direction is set to be substantially perpendicular to the mating 39a of the separated preliminary molds 36 and 37.

Figures 6A, 6B, 6C, 6D:
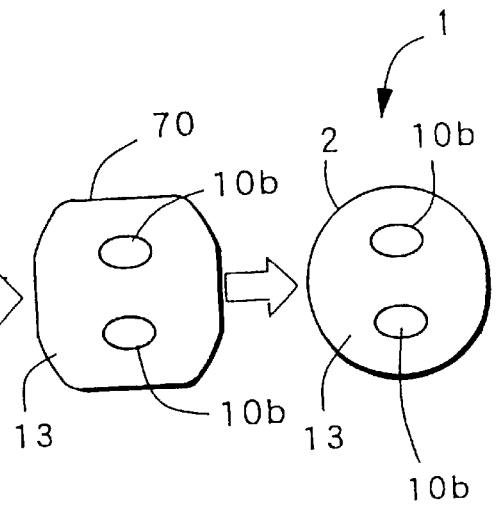
FIGS. 6A to 6D are schematic views showing changes in the sectional shape of a composite mold and sintered body in the method of manufacturing a ceramic heater according to the present invention.

The composite mold 39 thus obtained is provisionally sintered at a prescribed temperature (e.g. about 600° C.) to remove the component of the binder, thus providing a provisional sintered body 39' as shown in FIG. 6B (the provisional sintered body 39' can be regarded a composite mold in a wide sense). However, it should be noted that the provisionally sintered body 39' contains a remaining carbon component of a predetermined level or higher which has not been removed completely.

Figure 5A:
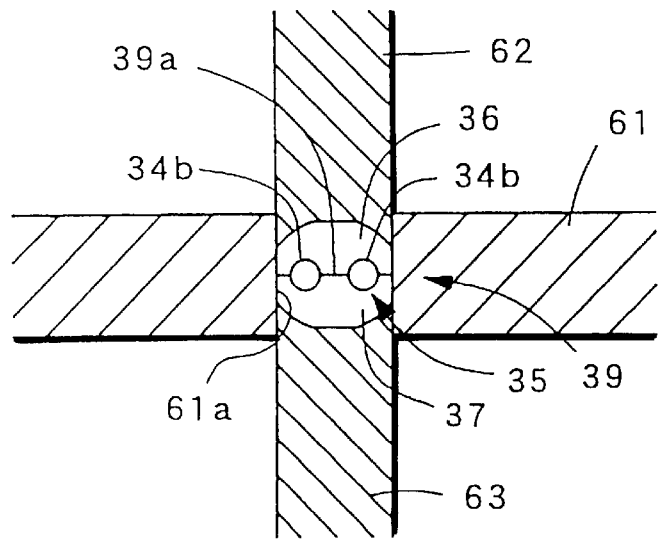
FIGS. 5A and 5B are views for explaining the steps succeeding to FIGS. 4A and 4B.
Figure 5B:
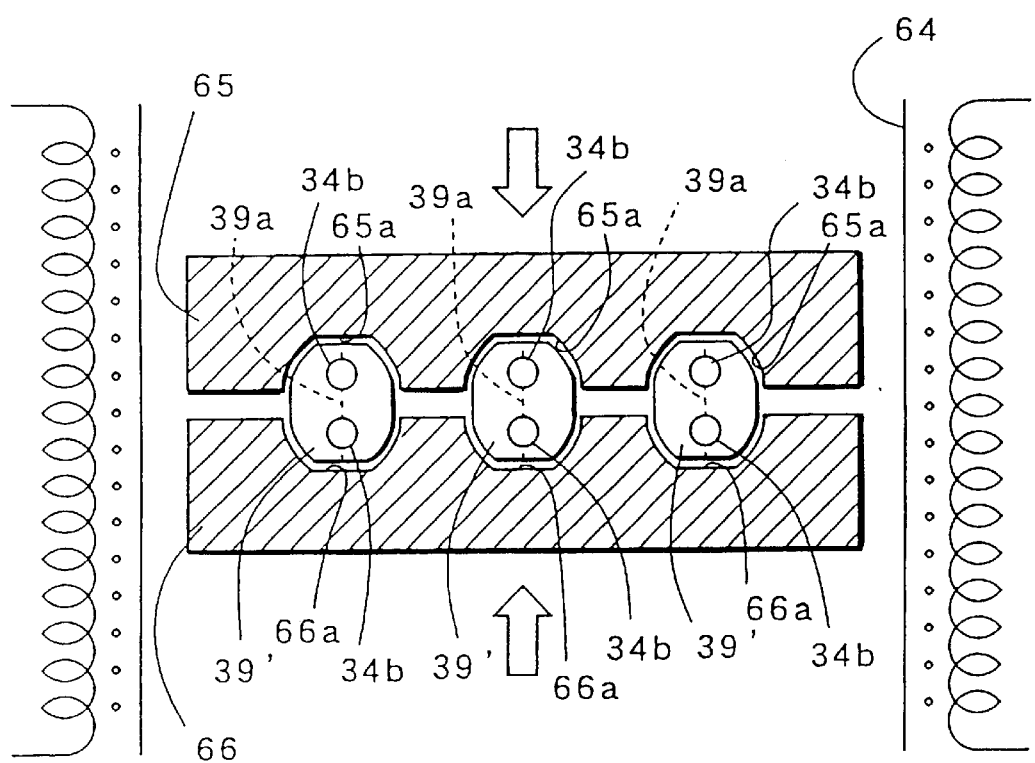

As shown in FIG. 5B, the provisionally sintered body 39' is set in cavities 65a and 66a of hot pressing molds 65 and 66 made of graphite. The provisional sintered body 39' is sintered within a furnace 64 at reduced atmospheric pressure at a predetermined sintering keeping temperature (1700° C. or higher, e.g. about 1800° C.) while it is pressurized between both molds 65 and 66, thus providing a sintered body 70 as shown in FIG. 6C. At this time, the heating element mold 34 constitutes the heating element 10, and the separated preliminary molds 36, 37 constitute the ceramic substrate 13. The electrode materials 30 constitute the electrodes 11 and 12.

While the temperature within the furnace is enhanced to the above sintering temperature, oxygen is introduced into the furnace so that the provisional sintered body is kept in the oxygen-containing atmosphere. The oxygen may be introduced into the furnace from when heating is started from room temperature or so and the oxygen-containing atmosphere may be maintained during the sintering temperature. Otherwise, the oxygen may be introduced at a predetermined temperature raised to a certain degree. The holding the provisional sintered body 39' in the oxygen atmosphere promotes the removal of the carbon component contained therein. In order to promote the removal of the carbon component effectively, it is preferred that the provisional sintered body 39' is kept in the oxygen containing atmosphere having oxygen partial pressure of $2\times10^{-4}$ to 1.0 Torr (preferably $3\times10^{-3}$ to $5\times10^{-2}$ Torr) at 1200° C. or higher for 7 minutes or longer. More preferably, the provisional sintered body 39' is kept at 1350° C. for 2 minutes or longer.

The oxygen can be introduced into the furnace in such a manner that the interior of the furnace is simply pressure-reduced and adsorbed to a predetermined pressure using a vacuum pump and the oxygen leaked into the furnace from the atmosphere (In this case, together with oxygen, the gaseous component within the atmosphere such as nitrogen or water vapor). Where it is desired that the oxygen partial pressure is adjusted more precisely, the interior of the furnace may be once pressure-reduced and adsorbed to high vacuum state of e.g. $10^{-5}$ Torr and a prescribed flow rate of oxygen is caused to flow through the furnace. On the other hand, a more simple technique may be adopted in which oxygen is mixed with the inert gas such as nitrogen or argon so as to provide a predetermined pressure of oxygen and the mixed gas thus created is caused to flow through the furnace.

Until the temperature reaches a sintering keeping temperature after the temperature has been raised to the target temperature or higher, nitrogen is introduced into the furnace 64 to provide a partial pressure of nitrogen of 0.5 Torr or more. In this state, the provisional sintered body 39' is sintered.

The provisional sintered body 39', as shown in FIG. 6B, is contracted in a direction along the mating face 39a of the separated preliminary molds 36 and 37, thereby providing a sintered body 70. As shown in FIG. 6C, the linear portion 34b of the heating element mold 34 is deformed, thereby providing a linear portion 10b of the heating element 10 having an elliptical section. Further, as shown in FIG. 6D, the periphery of the sintered body 70 is subjected to the processing such as grinding so that the section of the ceramic substrate is shaped into a circle to complete the ceramic heater 1.

In this way, the provisional sintered body 39' is heated in a kind of oxidizing atmosphere having the above range of partial pressure of oxygen in the furnace so that the removal of the remaining carbon component can be promoted and hence the content of the carbon component in the heating element 10 can be reduced to 3000 ppm or less (preferably, 2000 ppm or less). This effectively restricts the deformation of the $MoSi_2$ phase in the heating element due to its reaction with carbon and hence restrict creation of molybdenum carbide/silicide such as a $Mo_{4.8}Si_3C_{0.6}$ phase, Thus, the heating element can be obtained which has a good temperature-rising characteristic and little variation in an electric resistance.

For example, where $MoSi_2$ reacts with carbon to create the $Mo_{4.8}Si_3C_{0.6}$, its created quantity in the ceramic heater 1 can satisfy the following condition in an X-ray diffraction measurement by the diffractive metering using $K\alpha 1$ ray (wavelength: about 1.54 Å) of Cu as an incident X-ray. Assuming that Ii is the intensity of the peak (diffraction wave peak based on the (103) plane in the $MoSi_2$ phase) of the diffraction wave with the diffraction angle $\theta$ (unit: degree) satisfying $44.5°<2\theta<44.9°$ at the peak position and $I_2$ is the intensity of the peak (diffraction wave peak based on the (112) plane in the $Mo_{4.8}Si_3C_{0.6}$ phase) of the diffraction wave with the diffraction angle $\theta$ (unit: degree) satisfying $43.4°<2\theta<43.8°$ at the peak position, $I_1/(I_1+I_2)$ is not smaller than 0.98 (desirably, substantially).

Figure 7:
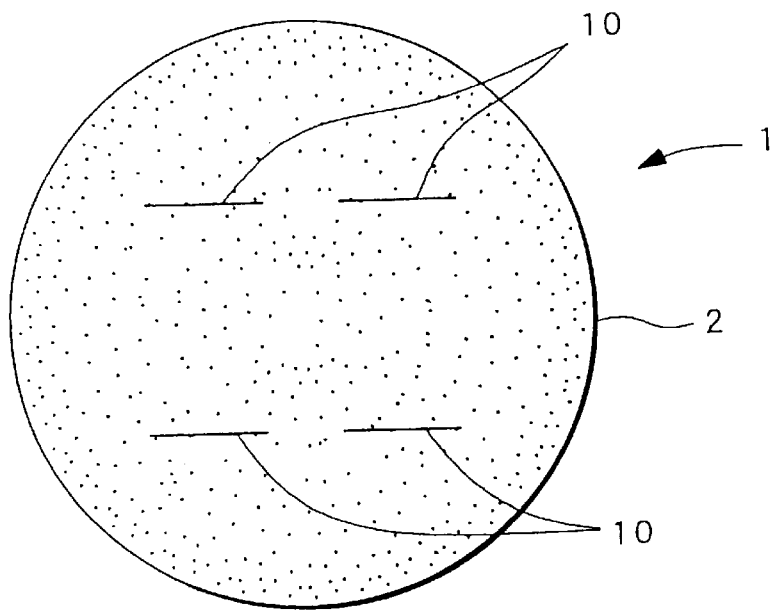
FIG. 7 is a sectional view showing another embodiment of the ceramic heater according to the present invention.

Incidentally, as shown in FIG. 7, the shape of the heating element pattern-printed on a mold of ceramic substrate powder using paste of conductive ceramic powder may be sintered so that its printed pattern is sintered, thus providing a resistive heating element 10.

EXAMPLES

Figure 3A:
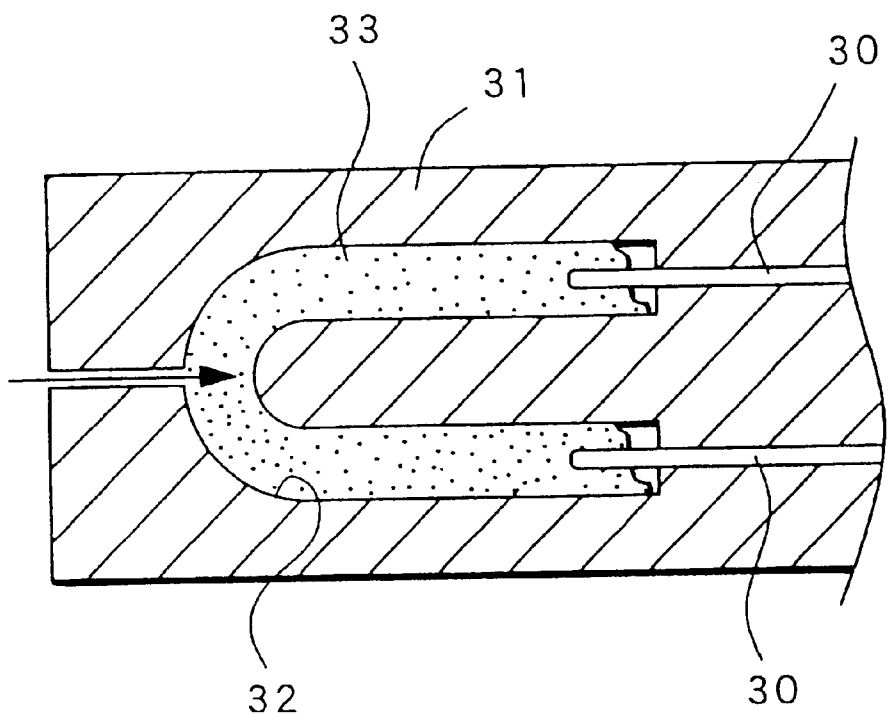
FIGS. 3A and 3B are views for explaining the process of manufacturing the ceramic heater.
Figure 3B:
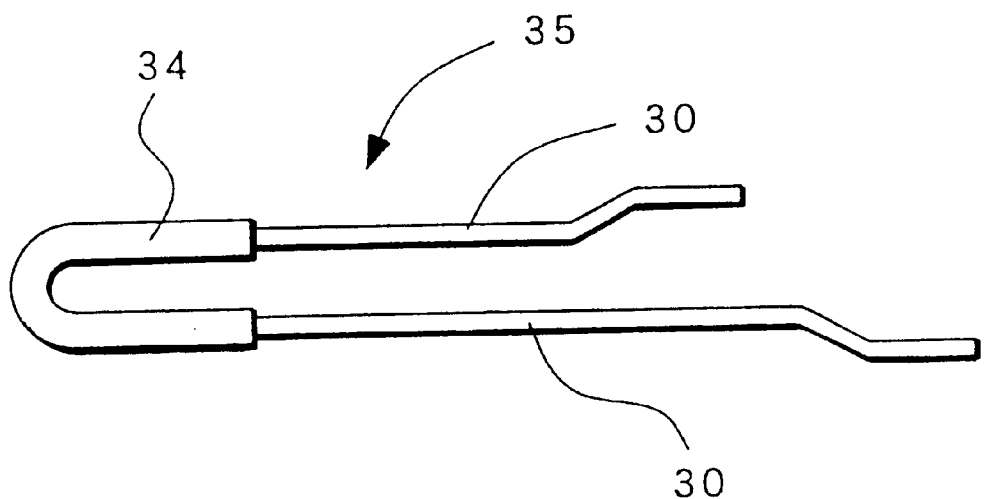

First, the raw powder for a heating element was prepared as follows. $MoSi_2$ having an average particle diameter of 1 $\mu$m of 40 weight part was mixed with silicon nitride ($Si_3N_4$) powder of 54 weight part and $Er_2O_3$ powder of 6 weight part serving as a sintering assistant were mixed with $MoSi_2$, and wet-stirred for 50 hours with solvent using a ball mill. The slurry thus created was dried for 12 hours at 150° C. The powder after drying of 90 weight part was mixed with polypropylene and wax of 10 weight part serving as an organic binder to provide a compound which was in turn granulated into pellets. The granulated pellets were injection-molded as shown in FIG. 3A to provide an integral mold 35 as shown in FIG. 3B.

The raw powder for a ceramic substrate was prepared as follows. First, the raw powder for a heating element was prepared as follows. Silicon nitride ($Si_3N_4$) powder having an average diameter of 0.7 $\mu$m of 90 weight part was mixed with $Er_2O_3$ powder of 10 weight part serving as a sintering assistant and wet-crushed using a ball mill. The powder thus obtained was mixed with a predetermined quantity of binder, and dried by a spray drying technique, thus providing the raw power for the ceramic substrate.

The separated preliminary molds 36 and 37 as shown in FIG. 4A were obtained using the above two kinds of raw powder by means of the technique described above. These molds 36 and 37 and the integral mold 35 were stamping-molded integrally to provide a composite mold 39 as shown in FIGS. 5A and 6A. The composite mold 39 was provisionally sintered at about 600° C. to provide a provisional sintered body 39' as shown in FIG. 6B. The composite mold 39 was sintered under several conditions, and the outer surface thereof was ground and shaped, thereby a ceramic heater having a diameter of 3.5 mm. Ten samples of the ceramic heater were obtained under each of several sintering conditions.

The sintering temperature was set at 1800° C., and for sample Nos. 1 to 12 indicated in Table 1, the temperature was raised at an average rate of 35° C./minute from room temperature (25° C.) to the sintering temperature. During temperature rising, the interior of the furnace was placed in an atmosphere of oxygen, nitrogen and argon in a temperature zone (hereinafter referred to as "temperature rising atmosphere") from a prescribed atmosphere starting temperature to a prescribed atmosphere ending temperature. On the other hand, when the atmosphere starting temperature was set for the temperature higher than the room temperature (25° C.), the interior of the furnace was placed in a vacuum-atmosphere of $2 \times 10^{-5}$ Torr in the temperature zone from the room temperature to the atmosphere ending temperature. After the atmosphere ending temperature was reached, in several kinds of atmosphere (hereinafter referred to as "sintering atmosphere") which are the same as or different from that during the temperature rising to the target temperature, the temperature within the furnace 64 was raised to 1800° C. which is a sintering temperature. The sample was hot-pressed for 30 minutes under the condition of 300 kgf/cm. Thereafter, the furnace was cooled. Incidentally, for sample No. 13, the atmosphere ending temperature which was 1450° C. is kept for ten minutes in the atmosphere during the temperature rising as described in Table 1 (the average temperature rising speed in the temperature rising zone except the temperature keeping zone was 35° C/minute). Additionally, the -table also indicates a time $\tau$ 1200 (unit: minute) while the sample was kept in the temperature rising atmosphere at 1200° C. or higher and a time $\tau$ 1350 (unit: minute) while the sample was kept in the temperature rising atmosphere at 1350° C. or higher.

TABLE 1

| A | B | C | D | E | F | G | H | I |
|---|---|---|---|---|---|---|---|---|
| 1 | $O_2/2 \times 10^{-2}$ | 25 | 1400 | 0 | 5.7 | 1.4 | 1800 | $N_2/1.0$ |
| 2 | $O_2/2 \times 10^{-2}$ | 25 | 1450 | 0 | 7.1 | 2.8 | 1800 | $N_2/1.0$ |

TABLE 1-continued

| A | B | C | D | E | F | G | H | I |
|---|---|---|---|---|---|---|---|---|
| 3 | $O_2/2 \times 10^{-2}$ | 25 | 1500 | 0 | 8.6 | 4.3 | 1800 | $N_2/1.0$ |
| 4 | $O_2/2 \times 10^{-2}$ | 25 | 1800 | 0 | 17.1 | 12.8 | 1800 | $N_2/1.0$ |
| 5 | $O_2/2 \times 10^{-5}$ | 25 | 1500 | 0 | 8.6 | 4.3 | 1800 | $N_2/1.0$ |
| 6 | $O_2/0.5$ | 25 | 1500 | 0 | 8.6 | 4.3 | 1800 | $N_2/1.0$ |
| 7 | $O_2/5.0$ | 25 | 1500 | 0 | 8.6 | 4.3 | 1800 | $N_2/1.0$ |
| 8 | $O_2/2 \times 10^{-2}$ | 25 | 1800 | 0 | 17.1 | 12.8 | 1800 | $O_2/2 \times 10^{-2}$ |
| 9 | $N_2/1.0$ | 25 | 1800 | 0 | 17.1 | 12.8 | 1800 | $N_2/1.0$ |
| 10 | $Ar/1.0$ | 25 | 1800 | 0 | 17.1 | 12.8 | 1800 | $Ar/1.0$ |
| 11 | $O_2/2 \times 10^{-2}$ | 1100 | 1450 | 0 | 7.1 | 2.8 | 1800 | $N_2/1.0$ |
| 12 | $O_2/2 \times 10^{-2}$ | 1300 | 1450 | 0 | 4.3 | 2.8 | 1800 | $N_2/1.0$ |
| 13 | $O_2/2 \times 10^{-2}$ | 1450 | 1450 | 10 | 10.0 | 10.0 | 1800 | $N_2/1.0$ |

A: Sample No.

B: Temperature-Rising Atmosphere and Partial Pressure (Unit: Torr)

C: Atmosphere Starting Temperature

D: Keeping Time

E: τ>1200 (min)

F: τ>1350 (min)

G: Sintering Temperature

H: Sintering Atmosphere and Partial Pressure

The content of carbon in the composition of the resistive heating element of the ceramic heater thus obtained was examined by the chemical analysis. The resistive heating element was subjected to the X-ray diffraction measurement at room temperature by a diffractive metering technique in the following manner. The ceramic heater was ground to expose a portion of the heating element to the ground surface. A Kα ray (wavelength: about 1.54 A) serving as an incident X-ray was caused to be incident on the ground surface. On the basis of the X-ray diffraction intensity profile thus obtained, the respective phases created in the resistive heating element were identified. In the X-ray diffraction intensity profile, the intensity I1 of the diffraction ray at 2θ=44.68° and the intensity $I_2$ at 2θ=43.58° were read to compute $I_1/(I_1+I_2)$. On the other hand, the electric resistance of each ceramic heater was measured at room temperature by the DC bridging technique. The average value thereof for ten samples for each sintering condition and the standard deviation were acquired. The result is shown in Table 2.

TABLE 2

| Sample No. | Carbon Content | Average Electric Resistance (Ω) | Standard Deviation of Electric Resistance | Created Phase | I1/ (I1 + I2) |
|---|---|---|---|---|---|
| 1 | 3500 | 0.650 | 0.040 | $MOSi_2$, $Mo_{4.8}Si_3C_{0.6}$ | 0.36 |
| 2 | 2000 | 0.352 | 0.010 | $MoSi_2$ | 1 |
| 3 | 1700 | 0.400 | 0.008 | $MoSi_2$ | 1 |
| 4 | 1850 | 0.375 | 0.012 | $MoSi_2$ | 1 |
| 5 | 6300 | 0.900 | 0.045 | $Mo_{4.8}Si_3C_{0.6}$ | 0 |
| 6 | 1800 | 0.360 | 0.003 | $MoSi_2$ | 1 |
| 7 | 1500 | ∞ | — | $MoO_3$, $SiC_2$ | — |
| 8 | 2100 | 0.382 | 0.009 | $MoSi_2$ | 1 |
| 9 | 6200 | 0.853 | 0.040 | $Mo_{4.8}Si_3C_{0.6}$ | 0 |
| 10 | 5800 | 0.880 | 0.065 | $MoSi_2$, $Mo_{4.8}Si_3C_{0.6}$ | 0.24 |
| 11 | 1800 | 0.360 | 0.011 | $MoSi_2$ | 1 |
| 12 | 6000 | 0.700 | 0.060 | $MoSi_2$, $Mo_{4.8}Si_3C_{0.6}$ | 0.15 |
| 13 | 1750 | 0.365 | 0.010 | $MoSi_2$ | 1 |

It can be seen from Table 2 that the samples (Nos. 2, 3, 4, 6, 8, 11, 13), which were placed in the oxygen containing temperature rising atmosphere of $2 \times 10^{-2}$ Torr and were kept an atmosphere for 7 minutes or longer at 1200° C., have little carbon content and a small standard deviation of an electric resistance in the heating element. It can also be seen from the value of $I_1/(I_1+I_2)$ that the $MoSi_2$ phase has not been almost deformed. Additionally, it can be seen that the samples (Nos. 1, 12), which were placed in the oxygen-containing temperature rising atmosphere but were not kept in an atmosphere for not less than 7 minutes at 1200° C., have more carbon content.

On the other hand, the sample for which the oxygen partial pressure in the temperature rising atmosphere has been reduced to $2 \times 10^{-4}$ Torr or lower, provided an abruptly increased carbon content (sample No. 5). Inversely, the sample for which the oxygen partial atmosphere exceeded 1.0 Torr, provided oxidation resolution of $MoSi_2$ (sample No. 7). The former results in an increased in the standard deviation of an electric resistance and the latter resulted in loss of the conductivity of the heating element. The sample which has been placed in the temperature rising atmosphere of nitrogen or argon also provided an increased carbon content in the heating element (sample Nos. 9, 10).

Figure 8:
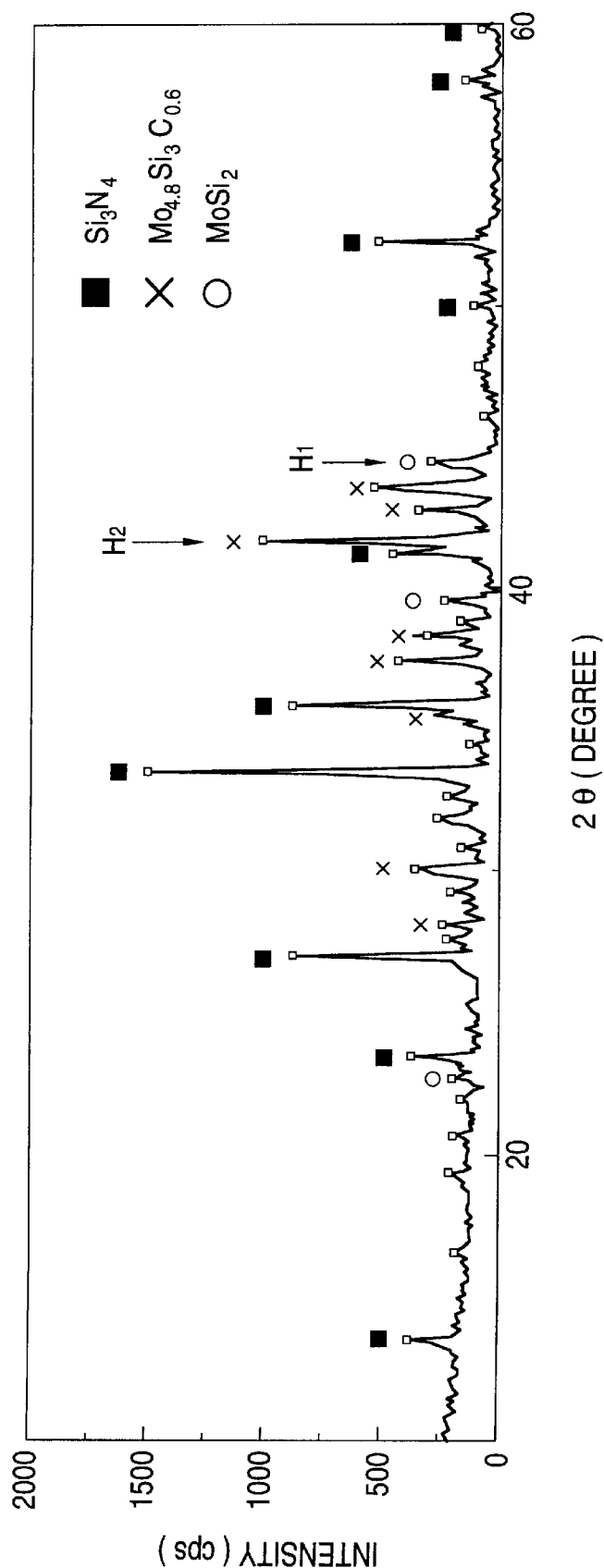
FIG. 8 is a graph showing the X-ray diffraction intensity acquired for sample No. 1.
Figure 9:
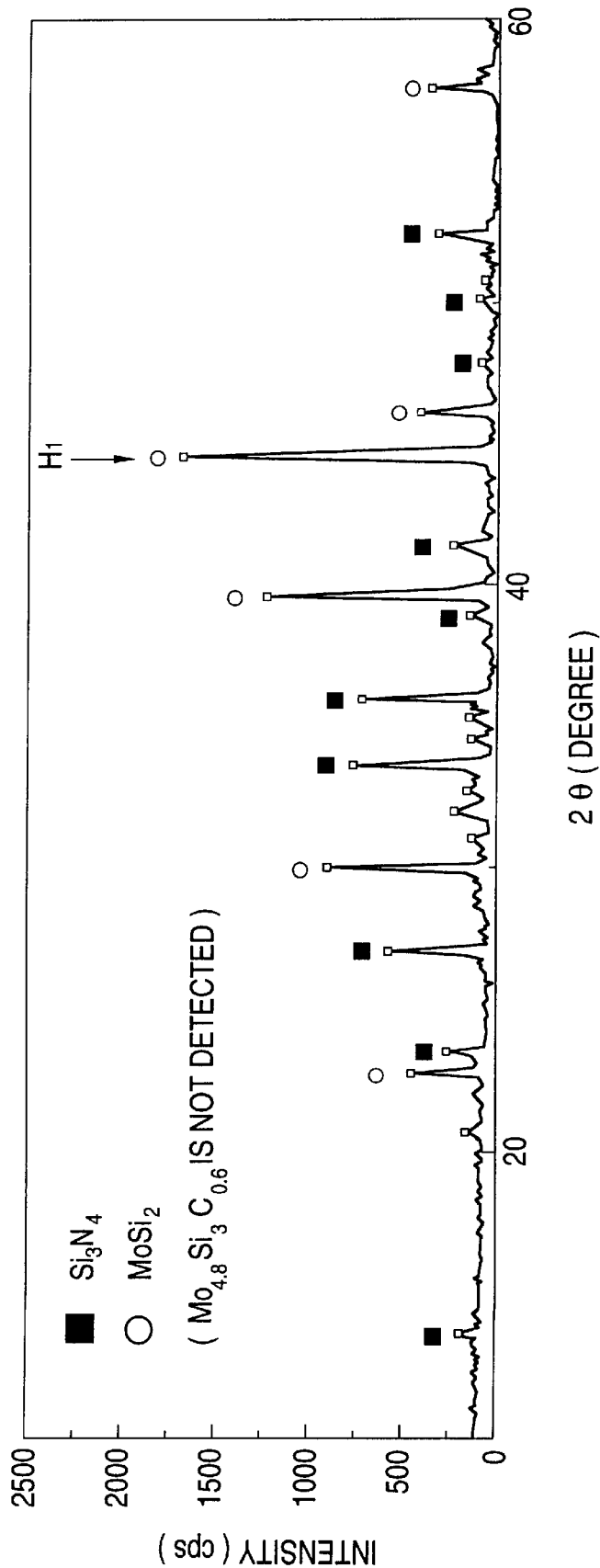
FIG. 9 is a graph showing the X-ray diffraction intensity acquired for sample No. 3.
Figure 10:
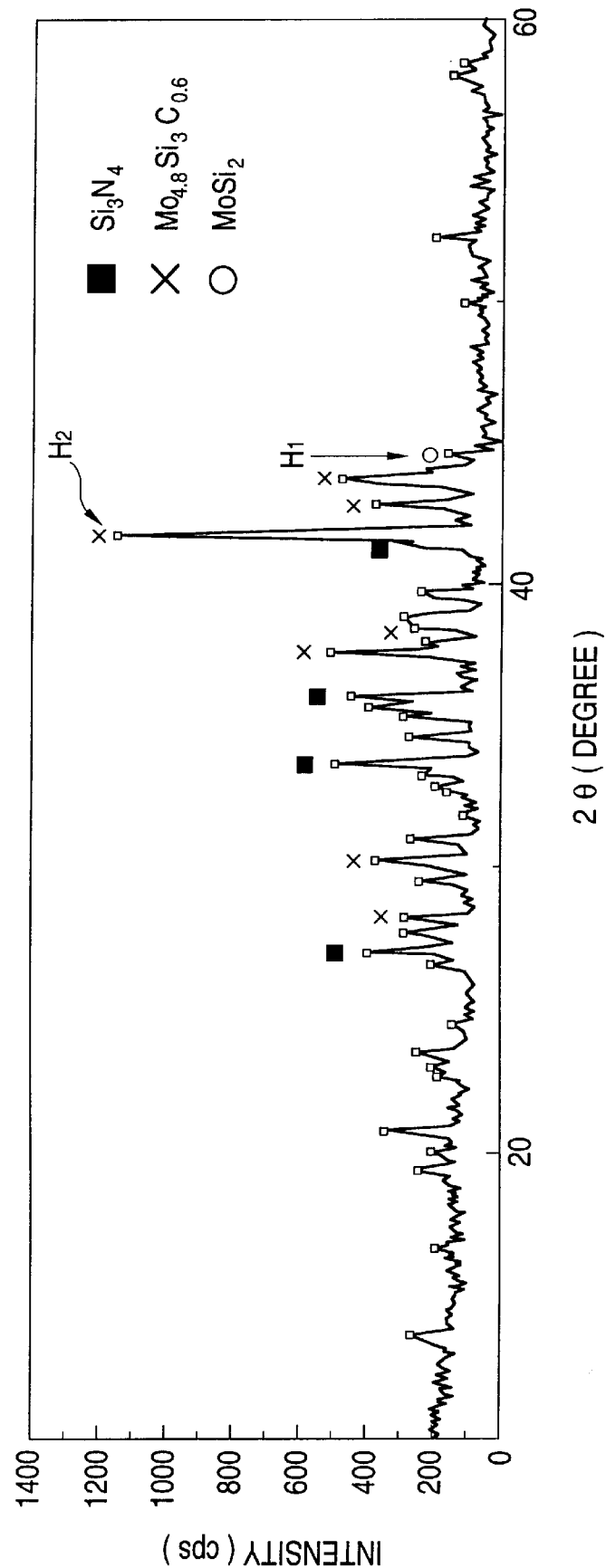
FIG. 10 is a graph showing the X-ray diffraction intensity acquired for sample No. 10.

FIGS. 8 to 10 show X-ray diffraction intensity profiles obtained for typical samples. In the drawings, marks ■, × and ○ denote diffraction wave peaks of a $Si_3N_4$ phase, $Mo_{4.8}SiC_{0.6}$ phase and $MoSi_2$ phase, respectively. H1 denotes a diffraction wave peak (based on diffraction in the (103) plane in the $MoSi_2$ phase) at 2θ=44.68°. H2 denotes a diffraction wave peak (based on diffraction in the (112) plane in the $Mo_{4.8}SiC_{0.6}$ phase) at 2θ=43.58°. FIG. 8 shows the profile of sample No. 1 which has been kept in the oxygen containing atmosphere for the time shorter than 7 minutes at 1200° C. . It can be seen that the $MoSi_2$ phase and the $Mo_{4.8}Si_3C_{0.6}$ phase are mixed. This is probably because the carbon containing content in the heating element has increased so that the $MoSi_2$ phase and carbon component have reacted with each other to create the $Mo_{4.8}Si_3C_{0.6}$ phase. FIG. 9 shows the profile of sample No. 3 which has been kept in the oxygen containing atmosphere for 8 minutes or longer at 1200° C. It can be seen that only the diffraction wave peaks of the $MoSi_2$ and $Si_3N_4$ phases have been created and the $Mo_{4.8}Si_3C_{0.6}$ phase has not almost created. FIG. 10 shows the profile of sample No. 10 (not based on the present invention) which has been heated in an argon containing atmosphere for the time shorter than 7 minutes at 1200° C. Like sample No. 1, it can be seen that the $MoSi_2$ phase and the $Mo_{4.8}Si_3C_{0.6}$ phase are mixed.

What is claimed is:

1. A method for manufacturing a ceramic heater having a structure in which a ceramic resistive heating element is embedded in a ceramic substrate, the ceramic resistive heating element containing a conductive ceramic phase comprising a metallic element component of metallic silicide having at least one element selected from the group consisting of Ta, Nb, Ti, Mo, Zr, Hf, V and Cr, comprising the steps of:

preparing a composite mold in which a heating element mold is embedded in a substrate mold being a mold of raw powder of said ceramic substrate, said heating element mold being prepared by mixing ceramic raw powder containing conductive ceramic powder to be said conductive ceramic phase with a prescribed quantity of molding assistant containing a carbon component and shaping said heating element mold into a prescribed shape of a resistive heating element;

sintering said composite mold at a sintering temperature of 1700° C. or higher; and during a process of rising temperature to said sintering temperature, keeping said composite mold in an oxygen containing atmosphere having an oxygen partial pressure in a range of $2\times10^{-4}$ to 1.0 Torr for 7 minutes or more at a temperature of 1200° C. or higher.

2. The method of manufacturing a ceramic heater according to claim 1, wherein a carbon content within said ceramic resistive heating element obtained by sintering is 3000 ppm or less.

3. The method of manufacturing a ceramic heater according to claim 1, wherein said step of keeping said composite mold includes keeping said composite mold in an oxygen containing atmosphere having an oxygen partial pressure of $2\times10^{-4}$ to 1.0 Torr for 2 minutes or more at a temperature of 1350° C. or higher.

4. The method of manufacturing a ceramic heater according to claim 1, wherein said ceramic heating element of said ceramic heater has a structure in which said conductive ceramic phase is dispersed in a matrix ceramic phase including $Si_3N_4$ or AlN, and said ceramic raw powder used for said heating element mold contains said conductive ceramic powder and $Si_3N_4$ powder or AlN powder.

5. The method of manufacturing a ceramic heater according to claim 4, wherein a nitrogen atmosphere having a nitrogen partial pressure of 0.5 Torr or higher is used as the atmosphere in which said composite mold is sintered at said sintering temperature.

6. The method of manufacturing a ceramic heater according to claim 1, wherein said conductive ceramic powder contains $MoSi_2$.

7. The method of manufacturing a ceramic heater according to claim 1, wherein an amount of conductive ceramic powder contained in the ceramic raw powder used for said heating element mold is in the range of 25 to 70% by weight.

8. The method of manufacturing a ceramic heater according to claim 1, wherein the conductive ceramic phase comprises a $MoSi_2$ phase; and wherein when said ceramic heating element is subjected to X-ray diffraction measurement at room temperature by a diffractive metering technique using a monochromatic X-ray having a wavelength of 1.54 Å, assuming that $I_1$ denotes an intensity of the diffraction wave peak satisfying $44.5°<2\theta<44.9°$ ($\theta$: diffraction angle at a peak position), and I2 is an intensity of the diffraction wave peak satisfying $43.40<2\theta<43.8°$, $I_1/(I_1+I_2)$ is not smaller than 0.98.

* * * * *

UNITED STATES PATENT AND TRADEMARK OFFICE
CERTIFICATE OF CORRECTION

PATENT NO. : 6,143,238
DATED : November 7, 2000
INVENTOR(S) : Konishi et al.

It is certified that error appears in the above-identified patent and that said Letters Patent is hereby corrected as shown below:

Claim 8,
Line 11, change "43.40" to -- 43.4° --.

Signed and Sealed this

Second Day of October, 2001

Attest:

NICHOLAS P. GODICI
Attesting Officer    Acting Director of the United States Patent and Trademark Office